United States Patent

[11] 3,632,943

[72] Inventors: Otto Engler;
Meinhard Muller, both of Karlsruhe, Germany
[21] Appl. No.: 61,599
[22] Filed: Aug. 6, 1970
[45] Patented: Jan. 4, 1972
[73] Assignee: Industrie-Werke Karlsruhe Aktiengesellschaft
Karlsruhe, Germany
[32] Priority: Oct. 10, 1969
[33] Germany
[31] P 19 51 161.6

[54] APPARATUS FOR MAKING SEALS ON TUBULAR CONTAINERS
11 Claims, 4 Drawing Figs.

[52] U.S. Cl. .................................................. 219/10.79, 219/10.49, 219/10.53
[51] Int. Cl. .................................................. H05b 9/02
[50] Field of Search .................................................. 219/10.53, 10.49, 10.79

[56] References Cited
UNITED STATES PATENTS
3,424,885  1/1969  Garney et al. ................ 219/10.53
2,448,690  9/1948  Storm .......................... 219/10.53
2,676,233  4/1954  Foxx ........................... 219/10.43 X
2,749,423  6/1956  Bisterfield ..................... 219/10.43

Primary Examiner—R. F. Staubly
Assistant Examiner—Hugh D. Jaeger
Attorney—Michael S. Striker ABSTRACT: An apparatus for making seals on tubular containers has a laminated wall provided with a seam and being composed of an inner layer of plastic material and a metal layer outside of the plastic layer. The apparatus includes a generating arrangement for generating high-frequency energy, a source of cooling medium for supplying the cooling medium to the generating arrangement, distributing means, conductors connecting the generating arrangement with the distributing means so as to supply energy and cooling medium from the latter to the former, and an electrode connected to the distributing means for receiving high-frequency energy and cooling medium from the distributing means. A damping arrangement damps eddy current leakage fields which tend to develop in the region of the seam in the tubular container in response to energization of the electrode.

INVENTORS
OTTO ENGLER
BY MEINHARD MULLER

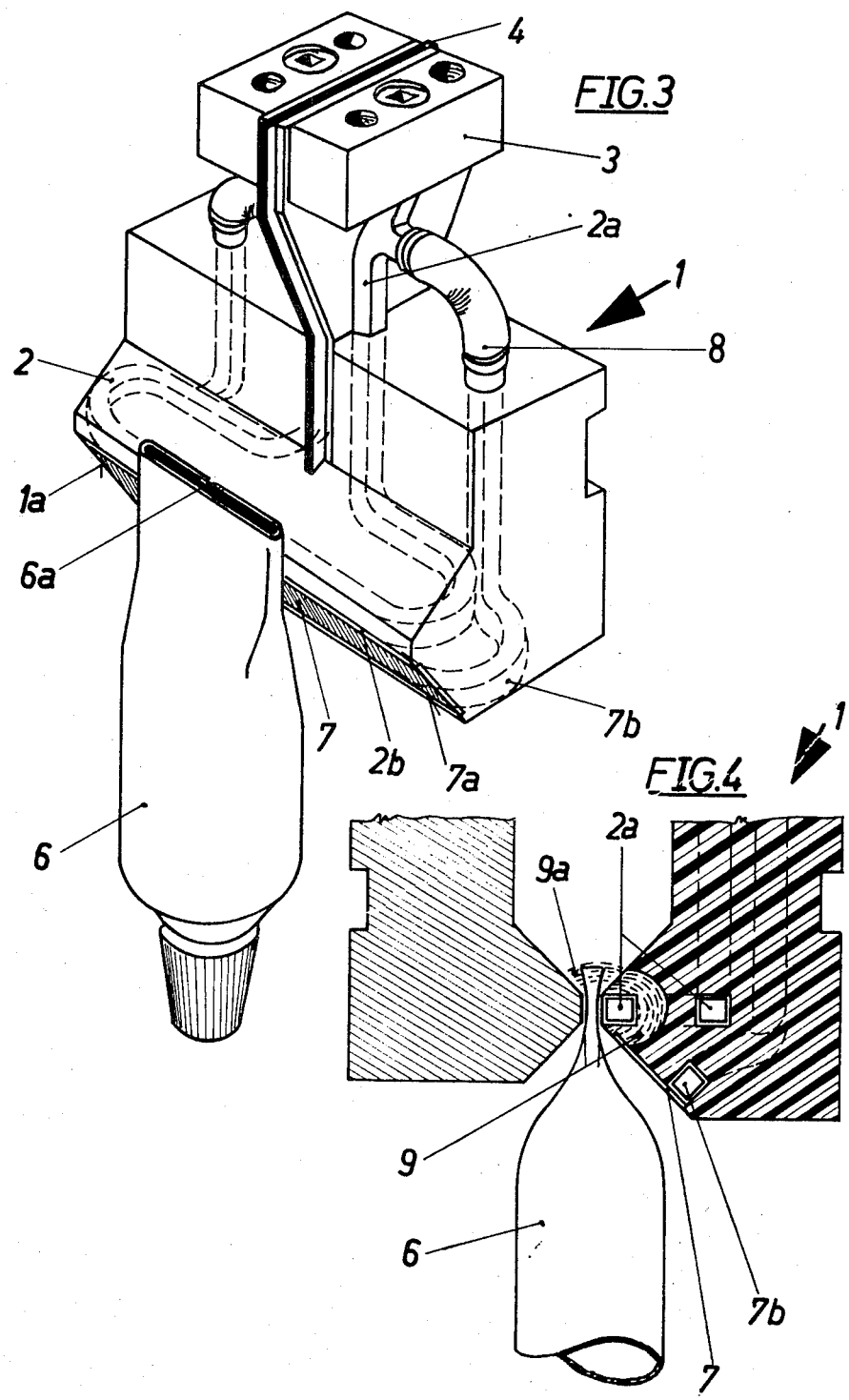

APPARATUS FOR MAKING SEALS ON TUBULAR CONTAINERS

CROSS-REFERENCES TO RELATED APPLICATIONS

A related application was filed on May 7, 1970, in the name of Otto Engler et al. under the title of "Apparatus for Making Seals on Containers" and is currently copending under Ser. No. 35,421.

BACKGROUND OF THE INVENTION

The present invention relates generally to sealing apparatus, and more specifically to apparatus for making seals on tubular containers. More specifically still, the invention relates to an apparatus for making transverse seals on collapsible tubular containers.

A great and increasing variety of goods, particularly those of a pastelike character such as tooth paste, cosmetics, pharmaceutical items and the like, are being packed in tubes which may consist of metal or of synthetic plastic material. The metal tubes are closed by folding their lower end, originally open to permit insertion of the material, several times back upon itself, in order to thereby close it. If the tubes are of synthetic plastic material they cannot be closed in this manner; instead, they are closed by heat welding for which purpose various different apparatuses are known.

The use of purely metallic or purely synthetic plastic tubes is frequently impossible, however, for instance if certain materials such as foodstuffs are of a type where the danger exists where the materials might undergo an undesired change in taste or aroma by contact with unsuitable metals or plastics from which the tube is made. Also, the possibility exists that an interaction could develop between the material of the tube and its contents which would endanger the health of the user, for instance if the contents are of edible nature, or which might spoil the contents for use.

Obviously, these problems cannot be tolerated and therefore attempts have been made to overcome them. It is know, for instance, to provide these tubes especially those in which foodstuffs are to be packed, in laminated form so that they consist of two, three, or even more layers. One known tube consists of three layers, namely an inner layer of synthetic plastic material having a low-dielectric loss factor, a metallic layer such as aluminum applied exteriorly over the inner layer and an additional outer layer surrounding the metallic layer and consisting of papers and/or synthetic plastic material. There are now even commercially available laminated tubes having as many as eight different layers, namely, and this is counting from the outside of the tube a transparent layer of high-pressure polyethylene, a printed white high-pressure polyethylene layer, a layer of paper, a layer of high-pressure polyethylene, a layer of copolymer with special adhesive characteristics, a layer of aluminum, a layer of copolymer and an inner layer of high-pressure polyethylene. Needless to say, the number of layers may vary in dependence upon the chemical and/or physical characteristics of the goods to be packaged in the tubes.

Generally speaking, multilayer laminated tubes of the character indicated above are usually produced in that the material is present in form of a stack of foils of the desired materials which are arranged in the desired sequence. The stack is then severed transversely into individual sections which thereupon are rolled up into cylindrical form, whereupon the thus obtained cylinder is provided with a longitudinally extending welded seam along an overlapped region. A shoulder portion of synthetic plastic material is inserted at one open longitudinal end of the cylinder, in a manner known to those skilled in the art and not of interest in the context of the present invention. In conventional manner the shoulder portion is provided with an outlet onto which a closure cap may be secured, as by cooperating screw threads or the like. Irrespective of how many layers such laminated tubes have, however, or of how the sequence of layers is arranged, at least one of the inner layers always consists of a synthetic plastic material which is weldable under the influence of heat and pressure.

It is desirable, for various reasons that the multilayer or laminated wall tubes be capable of being handled in the same manner as conventional tubes having a wall consisting either of metal or only of synthetic plastic material. Commercial packagers using such tubes of course already have large investments in apparatus heretofore acquired for handling tubes consisting either only of metal or only of synthetic plastic material, and it is evidently desirable to be able to use the laminated wall tubes in conjunction with such apparatus, or to at least require no more than auxiliary devices which can be used without too much difficulty and additional expense in combination with the existing apparatus.

When the tubes are ready for filling, they have one open end while the other end is closed by the aforementioned separately inserted shoulder piece or end piece which is in turn closed by a suitable cap. At the point of use the problem which exists with all tubes, and particularly with the laminated-wall tubes, is how to close the open ends of the tubes subsequent to introduction of the material into them. It must be kept in mind that this cannot be done in the same manner as with tubes consisting exclusively of metal or those which consist exclusively or plastic material. Experience has shown that multilayer tubes consisting in part of aluminum foil can be advantageously closed by means of the known inductive high-frequency welding methods. If, for instance, a metal coil supplied with high-frequency energy and having a circular cross section is moved over the open tube end of similarly circular cross section, then a high-frequency induction current will flow in the tubular aluminum layer constituting a part of the multilayer tube wall; this will heat the aluminum in the region of the coil. Other possibilities exist for employing inductive high-frequency methods so that in place of circular coils it is also possible to use single layer or divided coils, with single layer stretched or elongated coils being particularly suitable.

Of course, in order to effect the desired transverse seal at the open end of such a tube, that is in order to make portions of the single or several layers of heat-weldable synthetic plastic material adhere to one another in a sealing sense, it is already known to use manually or mechanically operable closure jaws. A variety of such jaws is known and in use commercially. For instance, if the tube is of the type heretofore used with conventional apparatus, and if the wall consists only of synthetic plastic material such as polyvinyl chloride or polyethylene, then conventionally the transverse seal is made by applying heat at the same time as the tube is collapsed along the line along which the seal is to be established. This collapse is effected by engagement with heated contact jaws of steel, copper, aluminum or aluminum alloys. Conventionally these jaws are provided with electrically heatable inserted elements which can be regulated in order to select a desired temperature range and maintain this during the operation. The edges of the jaws act in a manner analogous to electrodes and are for instance covered by glass fiber reinforced foils of synthetic plastic material, for instance that which is commercially available under the trade name "Teflon." The purpose of these foils is to prevent adhesion of the softening layer of synthetic plastic material of the tube to the jaw surfaces.

If heat impulse electrodes are used, they consist of a suitable metal and are covered with a heat-resistant insulating material. Onto this nonconductive layer the impulse ribbon is mounted in form for instance of a flat metallic strip. Brief high-frequency current pulses are passed through the metal ribbon which is thereby heated beyond the melting point of the synthetic plastic material of the wall of the tube, whereby in turn the synthetic plastic material is heated to melting along the seam along which it is simultaneously pressed into abutment, whereby the seal is established.

In both of these known methods the welding speed per time unit is relatively low because a relatively significant time delay is experienced in transmission of thermal energy from the welding tool through the covering layer of synthetic plastic material into the welding zone where the seal is to be made.

Another method which is known in this field for providing the desired transverse seals on tubes utilizing synthetic plastic material walls, is the use of electrode systems which operate with ultrared or infrared radiators. Here, two operating stages are required for the sealing process, distributed over several working steps. First, a pair of clamping jaws is provided which are cooled and which consist of metallic material. They engage and collapse the tube along the desired seam line and the material of the tube is then brought at both sides by ultrared or radiation to melting temperature. This, however, requires a period of several seconds before the requisite effect is reached and the article in this time passes through two or more successive operating stations. Once the required effect has been reached, the pressure and cooling are applied to the seam region at a further processing or operating station. However, this approach has been found by experience to be suitable only if the material of the tube wall is polyethylene because in this material the softening state is extended over a relatively wide temperature range. With the tubes of polyvinyl chloride this approach is not used in practical applications, but instead the capacitive high-frequency method is used for such material. Here, two plano-parallel metallic plates of copper are used constituting a pair of electrodes and having surfaces corresponding to the length and width of the desired sealed seam. They can be moved towards one another to define a very narrow gap between themselves and in so doing the originally cylindrical tube is collapsed or flattened at its open end, and is the juxtaposed wall portions obtained in this manner are then pressed together. Both of the electrode jaws must carry high-frequency currents of several thousand volts and therefore must be suspended or mounted in such a manner as to be well insulated. This construction results in heating of the layers of synthetic plastic material in the tube wall due to the electric dipole character of the polyvinylchloride molecules in accordance with the following formula $$W = A \cdot \omega \cdot \epsilon \cdot tg\delta \cdot E^2 \cdot 10^{-12} \text{ (Watt/cm.}^3)$$

where $W$=heat energy per unit volume
$A$=0.0885
$\omega$=cyclic frequency
$\epsilon$=dielectric constant
$tg\delta$=phase angle, and
$E$=field strength (in volt/cm.).

In this method the factor $tg$ is adequate for polyvinyl chloride, but for use with polyethylene this type of heating cannot be used because the $tg$ factor of polyethylene is only approximately 1/100 that of polyvinyl chloride. It follows, therefore, that the last-described method is suitable only for use with synthetic plastic material having a large $tg$ factor, and that in practice its use is limited to polyvinyl chloride. Also, the number of movements between open and closed positions performed by the jaws in this method is relatively small per minute, only between about 20 and 30 movements, it has not been found to be practical for economic reasons even with polyvinyl chloride tubes.

Another method which is known is the ultrafrequency welding method. This can be used with synthetic plastic materials of any common type, that is any type common in the field, because most thermoplastic materials can be welded together with ultrafrequency welding jaws consisting of a pressure jaw, the so-called sonotrode, which is metallic and mechanically vibrates and ultrasonic frequency, and a metallic counter jaw the anvil. However, because opening and closing of the jaws, the welding and the cooling of the seam takes place in a single station, the necessary cooling presents certain problems in this method. In machines operating with this method the time per sealing incident is relatively long and therefore in this method, also the number of tubes which can be closed per minute with a set of jaws is relatively small, only on the order of about 35–45 per minute.

While the aforementioned known methods all have certain advantages and disadvantages with respect to tubes whose wall is made only of synthetic plastic material, they are particularly limited and disadvantageous in certain respects where the tubes are of the multilayer or laminated wall-type. Just because of their multilayer wall construction the tubes are provided with a longitudinally extending seam, usually as mentioned before an overlapped seam. Such tubes can principally be provided with a transverse seal, that is have their open ends closed according to contact heating with normal heat and pressure jaw systems, or by the ultrasonic welding method. It has been found that if contact heating with pressure is employed, the heat transmission through the multilayer wall is retarded, on the one hand, whereas on the other hand the temperature sensitivity of the polymer layers must be considered so that the operating temperatures of the heating jaws cannot be substantially higher than 200° C. Where the ultrasonic frequency method is used with such tubes, it has been found that the intermediate layer of aluminum foil which is intended to constitute a metal barrier against diffusive influences of gases and water vapors, is disintegrated into individual metallic scraps by the high-energy ultrasonic frequencies, so that it completely loses its ability to carry out its assigned function.

A prior art attempt is known to overcome this last-mentioned problem, namely Swedish Pat. No. 214,471 which discloses a high-frequency welding apparatus on an inductive basis. Here, the welding system utilizes a pressure jaw which primarily is of synthetic plastic material and provided with an inductively operable elongated copper conductor the interior of which is water cooled. The copper conductor is supplied with high-frequency current at high voltage. This causes the development of a radial high-frequency magnetic field about the conductor. A similarly constructed tool of synthetic plastic material but without the conductor constitutes the anvil or counterpressure jaw. In operating on a multilayer tube of the type under discussion, the tube is inserted between the spaced-apart jaws and when they move to closed position it is collapsed in the region of its open end. The subsequent supply of high-frequency energy is operable for a brief period of time and the developing radial magnetic field causes high-frequency eddy currents in the metal foil which is embedded as one of the layers of the multilayer wall. These eddy currents heat in particular the wall along the desired sealing area, causing the inner layer of synthetic plastic material to melt and establishing a transverse seal under the simultaneous pressure of the pressure jaws. The conductor is continuously cooled with water and thus causes cooling of the once-established welded seam immediately after the welding has taken place. This makes it possible to afford briefer time intervals between welding incidents and to cause an increased throughput on the order of between 50 and 60 welds and therefore sealed tubes per minute.

Experience has shown, however, that improvements are necessary. Specifically, the radial magnetic field which develops upon energization of the apparatus has been found to cause the longitudinal seam present in the tubes to become weakened, that is to be loosened and/or to be develop leaks. This is found particularly if during welding the longitudinal seam of the tube faces the conductor supplied with high-frequency energy. To avoid this it has been suggested to so orient the tube by turning it, that the longitudinal seam will definitely face away from the welding jaw provided with the high-frequency conductor, and will face instead the counter-jaw which is not provided with high-frequency energy. Thus, only that flattened portions of the multilayer tube wall abuts against the high-frequency welding jaw which is not provided with the longitudinal seam and the eddy current field which develops in this layer so weaken the radial magnetic field that the negative influence on the now oppositely located longitudinal seam is avoided.

This solves the problem at hand, but imposes a limitation namely the necessary predetermined orientation of the longitudinal seam of the tube which is undesirable and frequently simply not acceptable. In this context it must be borne in mind that such tubes are usually provided with an imprint or the like so that the aforementioned prior art method forces the tube manufacturer to so locate the longitudinal seam with reference to the imprint as to accommodate the tube to the prior art sealing method. This makes the manufacture of these tubes much more difficult and economically unsound.

SUMMARY OF THE INVENTION

It is, accordingly, an object of the present invention to overcome the aforementioned disadvantages of the prior art.

More particularly it is an object of the present invention to overcome these aforementioned disadvantages in the sealing of multiwall or laminated-wall tubular containers.

In pursuance of the above objects, and others which will become apparent hereafter, one object of the invention resides in an apparatus for making seals in tubular containers having a laminated wall provided with a seam and comprising an inner layer of plastic material and a metal layer outside said plastic layer, according to which method the apparatus comprises generating means for generating high-frequency energy, a source of cooling medium for supplying such cooling medium to such generating means, and distributing means. Conducting means connects the generating means with the distributing means for supplying high-frequency energy and cooling medium from the latter to the former and electrode means is connected to the distributing means for receiving high-frequency energy and cooling medium from the same. Finally, damping means is associated with the electrode means for damping eddy-current leakage fields which tend to develop in the region of the seam in response to energization of the electrode means. Of course, the electrode means is intended to be in pressure engagement with the tubular container to be sealed.

The present invention is based on the realization that tests with known inductively operating electrodes indicate clearly in direct contrast to the teaching of the aforementioned Swedish Pat. No. 214,417 that no disadvantageous effect on the longitudinal seam of a tubular container of the type under discussion is to be observed in the tubular wall area contacted by the high-frequency carrying conductor if the longitudinal seam of the tubular container faces the high-frequency conductor or electrode. This is true, however, only where the conductor exerts direct pressure upon the tube wall while above and below this area that is above and below a seam with reference to the axial elongation of the tubular container the weld of the longitudinal seam is loosened under such circumstances. This loosening is the result of magnetic leakage fields which are emitted by the high-frequency carrying conductor at opposite sides of the transverse seam that is opposite with respect to the axial elongation of the tubular container and which induce eddy currents in those portions of the longitudinal welded seam of the tubular container which they contact.

The present invention therefore aims to overcome this problem. For this purpose means are to be provided to concentrate the radial magnetic field about the high-frequency conductor as much as possible into the transverse seam or seal which is being formed, and on the other hand to dampen or weaken the development of eddy-current fields outside the region of the transverse seal being formed. The first requirement is met in the construction according to the aforementioned copending related application, which provides for surrounding that portion of the welding jaw inductor loop which faces the tube to be sealed, over its entire length by a mass core which may for instance consist of ferrite or the like. Only that portion of the core which directly faces the tube wall surface is freed to expose a corresponding underlying portion of the inductor loop.

According to the present invention the other requirement of the two mentioned above is met by associating damping means with the high-frequency carrying conductor, which damping means serves to damp the electrical eddy-current leakage fields at opposite sides of the transverse seal being formed, so that the tubular container may be positioned with its longitudinal seam oriented in any desired manner with reference to the welding or sealing electrode jaw. Advantageously, this damping means will essentially consist of a relatively thin water-cooled metallic shield of nonferromagnetic material which extends in axially parallel direction and with spacing to the portion of the electrode which transmits high-frequency energy to the tubular container. The metallic shield is advantageously of double-walled construction to define an interior jacket through which cooling water may be circulated. Of course, it may also be of single-walled construction and provided with one or more tubular portions of preferably quadratic or rhombic cross section, or generally polygonal cross section for circulation of cooling water. It is particularly advantageous if the supply of cooling water for this shield is associated with the supply of cooling water for the electrode itself and if at the inlet and outlet end to the cooling water passage of the shield the latter is connected with the cooling water supply for the electrode by means of an insulating element, that is a tubular connector which is of nonconductive material, such as a synthetic plastic. Such plastic may be polyvinyl chloride or another suitable synthetic plastic.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view analogous to FIG. 1 illustrating a tubular container to be provided with a transverse seal, shortly before the seal is made; and FIG. 4 is a somewhat diagrammatic vertical section through the embodiment in FIG. 3 but showing both contact jaws at the moment at which a transverse seal of the tubular container is being effected.

DESCRIPTION OF THE PREFERRED EMBODIMENTS

Figure 1:
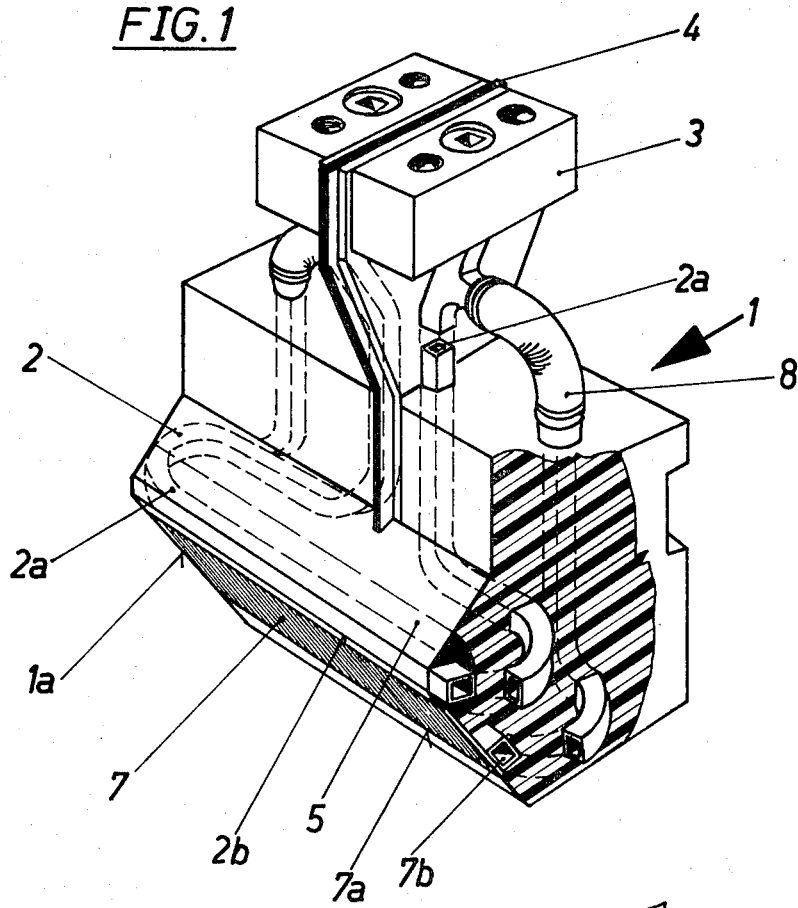
FIG. 1 is a somewhat diagrammatic perspective view, partly broken away, of an apparatus illustrating an embodiment of the invention.

Discussing now the drawing in detail, and firstly FIG. 1 thereof, it will be seen that reference numeral 1 identifies a sealing jaw of an apparatus for making transverse seals on tubular containers. It is essentially composed of a body consisting of synthetic plastic resin or the like in which there is embedded a water-cooled inductor loop 2 which may for instance consist of a tube having a quadratic, rhombic or generally polygonal cross section. The ends of the loop terminate in a connecting portion 3 which is divided into two sections by insulating element 4. A mass core 5 consisting for example of ferrite or the like surrounds the conductor loop 2 and is provided with a cutout, opening or the like only at that side of the loop 2 which directly faces the tubular container 6 (see FIGS. 3 and 4) where the latter is to be provided with a transverse seal.

According to the invention the downwardly inclined surface 1a of the jaw 1 is provided with a relatively thin metallic shield 7 of nonferromagnetic material. The shield is so arranged that between the upper edge of the shield and the portion 2a of the conductor loop 2 which is parallel with this upper edge, a gap 2b remains in order to assure that an electrically conductive contact between the shield 7 and the loop 2 is impossible. The purpose of the shield 7 is to dampen or weaken as much as possible the eddy-current leakage fields which occur in the region of the longitudinal seam of the tubular container 6 outside the area or line along which the transverse seal is being produced.

We have found it to be particularly advantageous to provide separate cooling means for counter acting the heat developing in the shield 7 as a result of the eddy currents. According to FIG. 1 the shield 7 is provided in the region of its lower edge 7a with a tubular passage 7b through which cooling water flows, and which passage 7b may be in the form of a tube or the like of quadratic, rhombic or generally polygonal cross section. This makes it possible to fully utilize the effect of the mass core 5 for the actual welding region.

Of course, it is possible to arrange such a tubular passage 7b in another manner on the shield 7. It is very advantageous to connect the tubular passage 7b with the cooling water supply 2a for the inductor loop 2 itself, so that a separate supply can be avoided. In this case a connection between the conductor-loop cooling-water supply 2a and the passage 7b is established via a connecting portion 8 of synthetic plastic material, that is nonconductive material.

Figure 2:
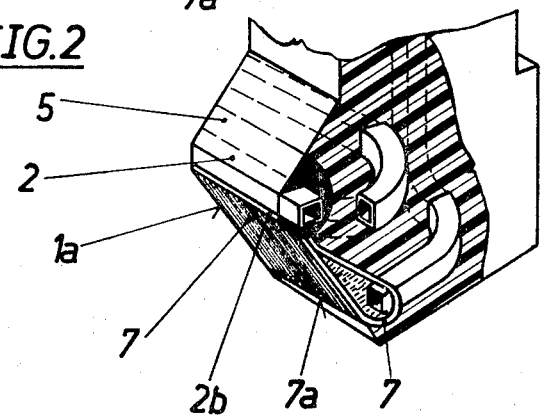
FIG. 2 is a view similar to FIG. 1 illustrating a further embodiment of the invention.

The embodiment of FIG. 2 is different from the embodiment of FIG. 1 essentially in that the shield 7 is of double-walled construction so that a separate tubular passage 7b is not necessary and instead the cooling water can flow through the jacket defined by the double walls. Of course, in this embodiment the cooling effectiveness is greatly increased over that of FIG. 1 because of the larger surface areas which can be contacted by the cooling water. The latter is advantageously again supplied in the same manner as in FIG. 1, that is by connection of the jacket defined between the double wall with the cooling water supply 2a for the inductor loop 2.

Coming to the embodiment in FIG. 3 it will be seen that utilizing the present invention the longitudinal seam 6a of the tubular container 6 may without any difficulties face and abut against the portion 2a of the conductor loop 2 which is supplied with high-frequency energy, without having the slightest disadvantageous effect upon the longitudinal seam 6a. Therefore, it is not necessary to provide for separate orientation of the tubular containers 6 prior or during welding with respect to the high-frequency carrying welding jaw. This eliminates the means heretofore necessary for such orientation and eliminates taking the position of the welded seam into account with respect to any imprints or the like provided on the tubular container 6.

FIG. 4 shows how the shield 7 absorbs the eddy-current leakage fields 9 which originate in the conductor loop portion 2a. On the other hand, the parts 9a of the fields 9 can continue to be emitted above the tubular container 6 without any hindrance, but without being able to cause a negative effect on the longitudinal seam 6a. Tests which have been undertaken show that the same damping effect can also be achieved above the portion 2a if desired, if the shield 7 is so constructed as to also be located above the portion 2a.

It is pointed out, however, that for the conventional transverse sealing operation of multilayer tubular containers the arrangement of the shield 7 to provide the damping or shielding effect both above and below the transverse seal is not necessary, because these portions of the tubular container which extends upwardly above that is in the drawing the transverse seal is cut off after it has cooled. Naturally, if for certain reasons the upwardly projecting portion of the tubular container is to be shielded in this manner, then the shield 7 may be provided both above and below the transverse seal region. This could be the case if undesired vaporization of liquid plastic residue is to be avoided.

The present invention is exceedingly simple and inexpensive, both in its construction and in its manufacture. Moreover, it can be readily employed in existing sealing apparatuses of the type under discussion, thereby making it unnecessary to replace the entire apparatus.

Furthermore, the present invention has made it possible for the first time to provide transverse seals on tubular containers having longitudinal seams or seals, without deleterious effect upon the longitudinal seams or seals irrespective of the orientation of such longitudinal seams or seals with reference to the welding electrode. In addition, the present invention has the advantage of providing for the first time practically usable means for shielding and damping undesired electrical eddy-current leakage fields and doing this in such a manner that any damage to the longitudinal seam of a tubular container being provided with a transverse seal in a sense causing weakening and leakage of such longitudinal seam is avoided.

It will be understood that each of the elements described above, or two or more together, may also find a useful application in other types of constructions differing from the types described above.

While the invention has been illustrated and described as embodied in an apparatus for making seals on tubular containers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. In an apparatus for making seals on tubular containers having a laminated wall provided with a longitudinally extending seam and comprising an inner layer of plastic material and a metal layer outside said inner layer, a combination comprising a first contact jaw of electrically insulating material, and a second jaw operative for cooperation with said first jaw in holding a tubular container between them; electrode means provided in one of said jaws and engageable under pressure with a tubular container to be sealed, conducting means operatively associated with said electrode means for supplying high-frequency energy and a cooling medium thereto; and electromagnetic shield means constituting an open circuit and operatively associated with said electrode means for damping eddy-current leakage fields which tend to develop in the region of said seam in response to energization of said electrode means, whereby to permit positioning of a tubular container between said jaws with any desired orientation of said seam relative to said one jaw.

2. In an apparatus as defined in claim 17, said electrode means comprising an electrode portion arranged to transmit high-frequency energy to said tubular container for making a seal on the latter; and wherein said shield means cooperates with said electrode portion.

3. In an apparatus as defined in claim 2, said shield means comprising a cooled shield of nonferrous magnetic metallic material extending along but spaced from said electrode portion.

4. In an apparatus as defined in claim 3; further comprising cooling means for cooling said shield.

5. In an apparatus as defined in claim 4, said cooling means comprising water supply means for supplying cooling water to said shield.

6. In an apparatus as defined in claim 4; said shield comprising passage means, and wherein said cooling means comprises water supply means for supplying cooling water to said passage means.

7. In an apparatus as defined in claim 6, said shield being double walled and housing an internal space constituting said passage means.

8. In an apparatus as defined in claim 6, said shield having a single-thickness wall and including a tubular shield portion constituting said passage means and extending along said portion of said electrode means.

9. In an apparatus as defined in claim 8, wherein said tubular portion is of at least substantially quadratic cross section.

10. In an apparatus as defined in claim 8, wherein said tubular portion is of rhomboid cross section.

11. In an apparatus as defined in claim 8, wherein said tubular portion is of polygonal cross section.